(12) United States Patent
Nakayama (10) Patent No.: US 10,053,008 B2
(45) Date of Patent: Aug. 21, 2018

(54) LIGHT EMITTING ELEMENT DRIVING DEVICE, LIGHT EMITTING DEVICE, AND VEHICLE

(71) Applicant: Rohm Co., Ltd., Kyoto (JP)

(72) Inventor: Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/458,310

(22) Filed: Mar. 14, 2017

(65) Prior Publication Data

US 2017/0267174 A1 Sep. 21, 2017

(30) Foreign Application Priority Data

Mar. 18, 2016 (JP) ................................. 2016-055482

(51) Int. Cl.
*B60Q 1/04* (2006.01)
*B60Q 1/30* (2006.01)
(Continued)

(52) U.S. Cl.
CPC .......... *B60Q 11/005* (2013.01); *B60Q 1/2607* (2013.01); *B60Q 1/30* (2013.01);
(Continued)

(58) Field of Classification Search
CPC .............. H05B 33/0815; H05B 33/083; H05B 33/0803; H05B 33/089; H05B 33/0806;
(Continued)

(56) References Cited

U.S. PATENT DOCUMENTS 4,961,028 A 10/1990 Tanaka
5,216,328 A 6/1993 Lu
(Continued)

FOREIGN PATENT DOCUMENTS

DE 10 2004 038 425 11/2005
JP 2004-034741 2/2004

OTHER PUBLICATIONS

European Patent Office; Extended European Search Report dated Jul. 20, 2017 in corresponding European patent application No. 17161612.1 (9 pages).

*Primary Examiner* — Douglas W Owens
*Assistant Examiner* — Wei Chan
(74) *Attorney, Agent, or Firm* — Fish & Richardson P.C.

(57) ABSTRACT

A light emitting element driving device includes a first and second driving circuits, an abnormality detecting portion, a bypass path, and a switching portion. The first driving circuit can supply power to a light emitting element in a first mode, and is disabled to supply power in a mode other than the first mode. The second driving circuit can supply power to a light emitting element in a second mode. The abnormality detecting portion detects an abnormality of the light emitting element normally connected to the second driving circuit at least in the second mode. The bypass path connects the first driving circuit to the second driving circuit. The switching portion is disposed in the bypass path so as to make the bypass path into a conductive state when an abnormality is detected, and to make the bypass path into a cutoff state when an abnormality is not detected.

25 Claims, 8 Drawing Sheets

(51) Int. Cl.
 *B60Q 11/00* (2006.01)
 *H05B 33/08* (2006.01)
 *B60Q 1/44* (2006.01)
 *B60Q 1/26* (2006.01)

(52) U.S. Cl.
 CPC ............ *B60Q 1/44* (2013.01); *H05B 33/089* (2013.01); *H05B 33/0827* (2013.01)

(58) Field of Classification Search
 CPC .. H05B 33/0827; B60Q 1/1415; B60Q 1/143; B60Q 1/2603; B60Q 1/486; B60Q 2300/05; B60Q 2300/054; B60Q 2300/112
 USPC ..... 315/82, 193, 186, 224, 291, 307, 33, 77, 315/80
 See application file for complete search history.

(56) References Cited

U.S. PATENT DOCUMENTS

2004/0075393 A1\* 4/2004 Ito ...................... H05B 33/0815 315/77
2004/0212310 A1\* 10/2004 Ito ......................... B60Q 11/00 315/77

\* cited by examiner

IN SECOND MODE, ABNORMALITY OCCURS IN Z2

IN TAIL MODE

RELATED ART
Fig.9C

IN STOP MODE

RELATED ART
Fig.9D

IN STOP MODE, ABNORMALITY OCCURS IN Z2

RELATED ART
Fig.9E

IN TAIL MODE, ABNORMALITY OCCURS IN Z2

RELATED ART
Fig.10

LIGHT EMITTING ELEMENT DRIVING DEVICE, LIGHT EMITTING DEVICE, AND VEHICLE

CROSS-REFERENCE TO RELATED APPLICATIONS

This nonprovisional application claims priority under 35 U.S.C. § 119(a) on Patent Application No. 2016-055482 filed in Japan on Mar. 18, 2016, the entire contents of which are hereby incorporated by reference.

BACKGROUND OF THE INVENTION

Field of the Invention

The present invention relates to a light emitting element driving device arranged to drive a light emitting element, and a light emitting device and a vehicle using the light emitting element driving device.

Description of Related Art

Figure 9A:
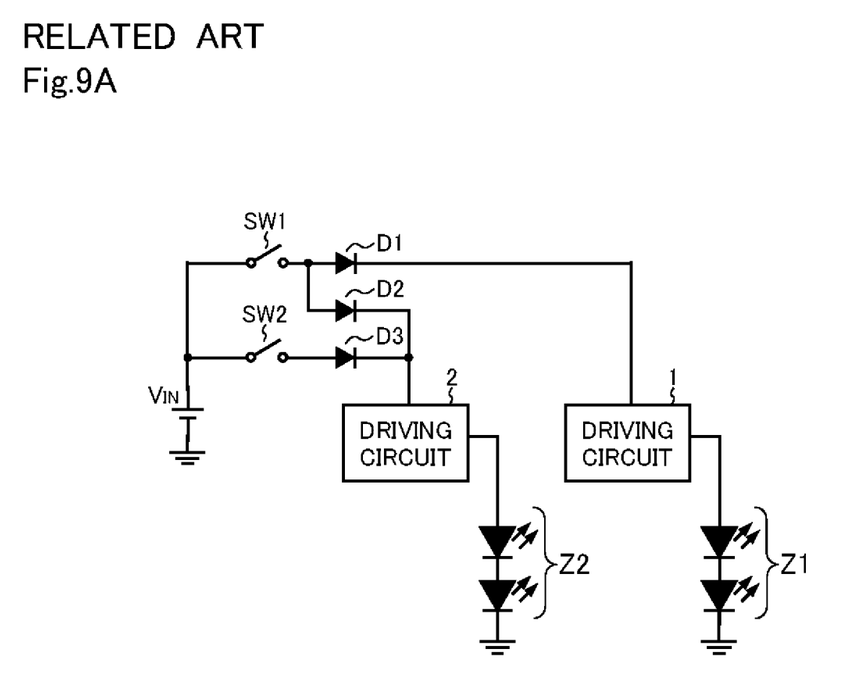
FIG. 9A is a diagram illustrating a general structural example of a light emitting device including a tail lamp and a stop lamp.

FIG. 9A is a diagram illustrating a general structural example of a light emitting device including a tail lamp and a stop lamp mounted in the vehicle. The light emitting device illustrated in FIG. 9A includes switches SW1 and SW2, diodes D1 to D3, driving circuits 1 and 2, at least one light emitting element (light emitting diode in FIG. 9A) Z1, and at least one light emitting element (light emitting diode in FIG. 9A) Z2. The light emitting element Z1 is a stop lamp, and the light emitting element Z2 is a tail and stop lamp.

Figure 9B:
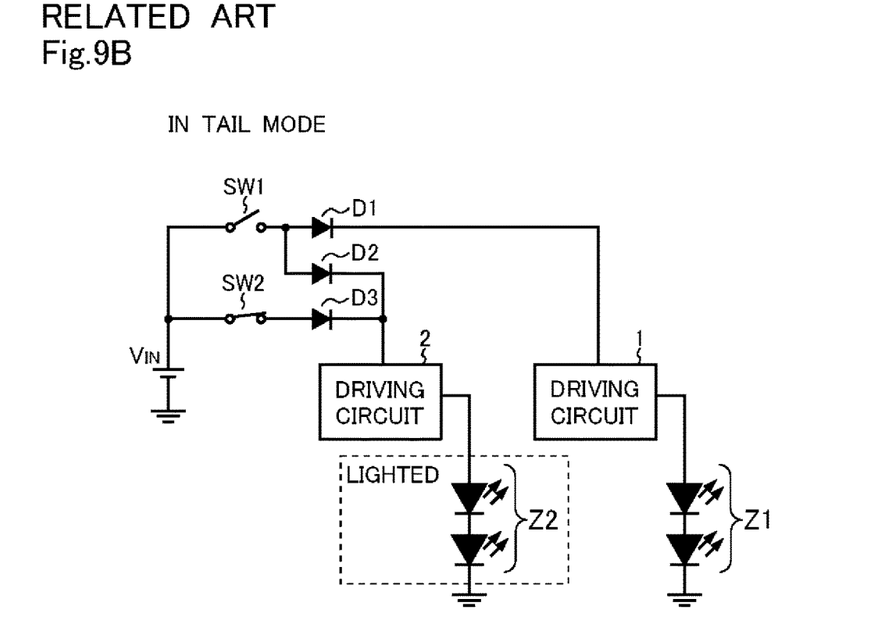
FIG. 9B is a diagram illustrating a lighting state in a tail mode of the light emitting device illustrated in FIG. 9A.

In a tail mode in which the tail lamp is lighted, the switch SW2 becomes ON state so that an input voltage $V_{IN}$ is supplied to the driving circuit 2 via the switch SW2 and the diode D3. Thus, the driving circuit 2 drives the light emitting element Z2, and the light emitting element Z2 is lighted as illustrated in FIG. 9B.

Figure 9C:
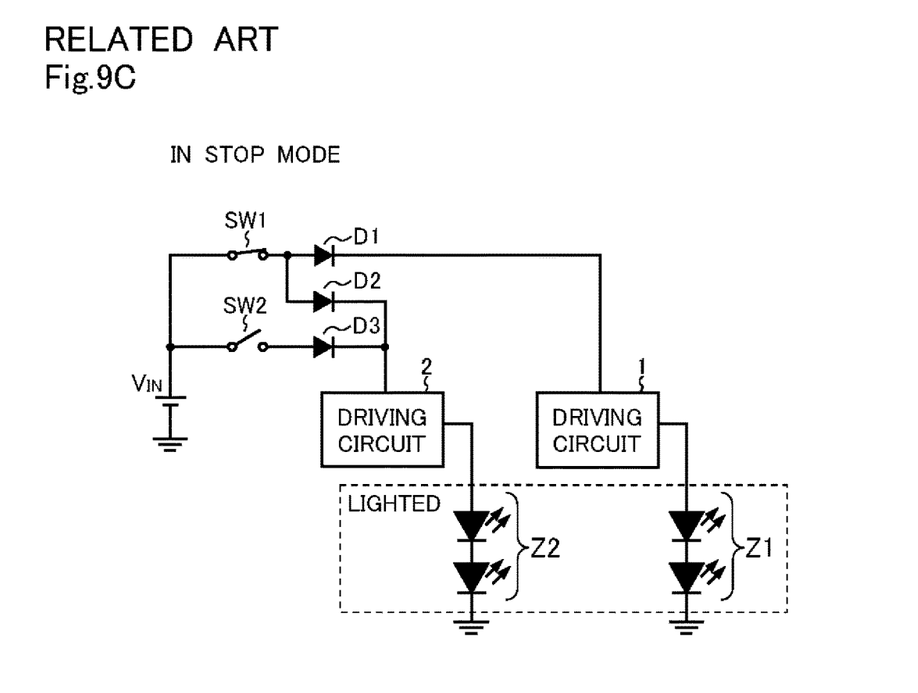
FIG. 9C is a diagram illustrating a lighting state in a stop mode of the light emitting device illustrated in FIG. 9A.

In a stop mode in which the stop lamp is lighted, the switch SW1 becomes ON state so that the input voltage $V_{IN}$ is supplied to the driving circuit 1 via the switch SW1 and the diode D1 and also is supplied to the driving circuit 2 via the switch SW1 and the diode D2. Thus, the driving circuit 1 drives the light emitting element Z1 while the driving circuit 2 drives the light emitting element Z2, and hence the light emitting elements Z1 and Z2 are lighted as illustrated in FIG. 9C.

Figure 9D:
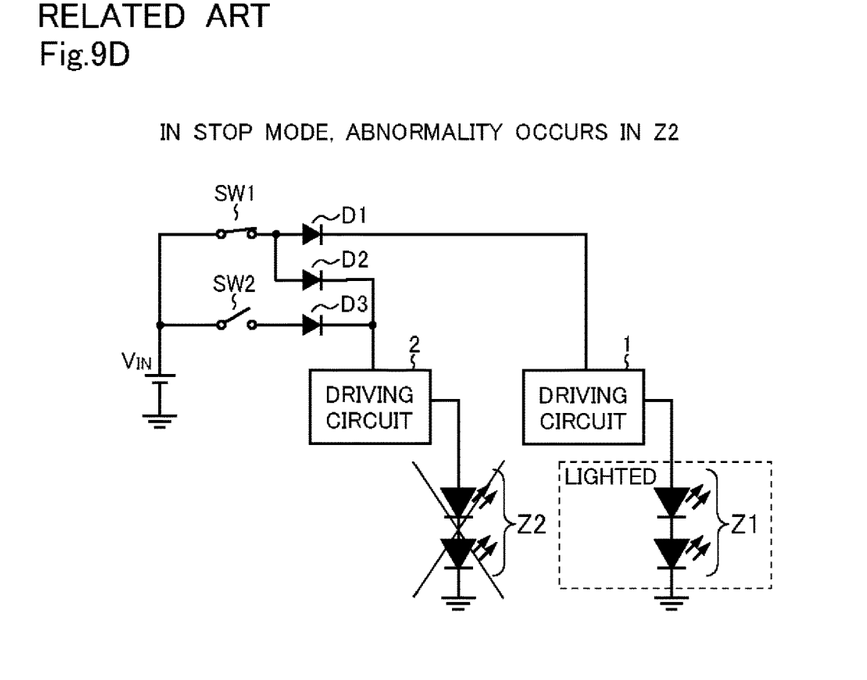
FIG. 9D is a diagram illustrating a lighting state in the stop mode of the light emitting device illustrated in FIG. 9A when an abnormality occurs in the tail and stop lamp.
Figure 9E:
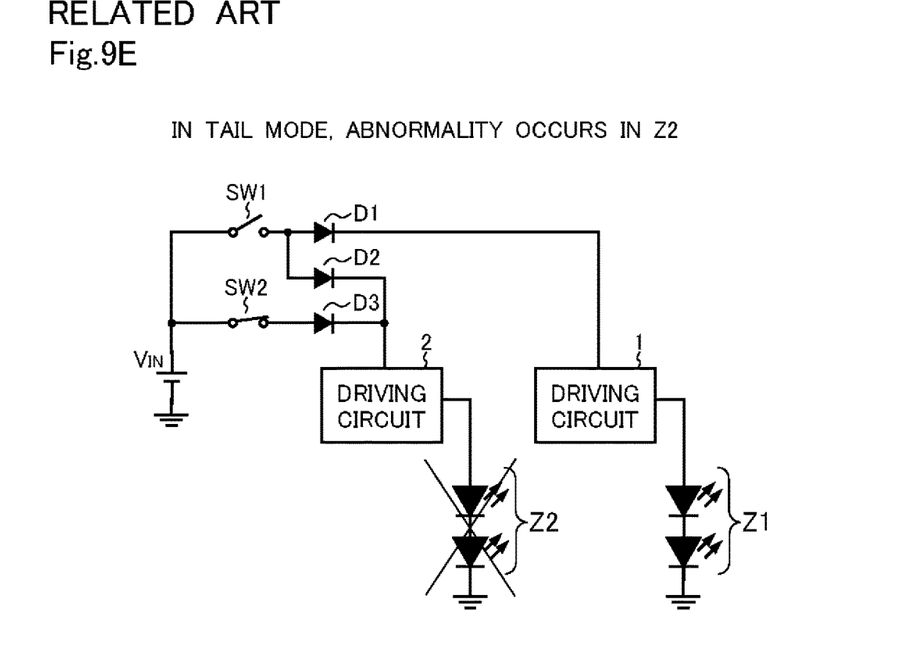
FIG. 9E is a diagram illustrating a lighting state in the tail mode of the light emitting device illustrated in FIG. 9A when an abnormality occurs in the tail and stop lamp.

Here, it is supposed that an abnormality occurs in the light emitting element Z2, and hence the light emitting element Z2 is not lighted at all when the driving circuit 2 supplies power to the light emitting element Z2. In this case, the light emitting element Z1 is lighted in the stop mode as illustrated in FIG. 9D, while none of the light emitting elements Z1 and Z2 is lighted in the tail mode as illustrated in FIG. 9E.

The tail lamp is used for informing a driver of a following vehicle that there is a preceding vehicle at night or in a bad weather such as thick fog or snowstorm. Therefore, if none of lamps positioned on the rear of the vehicle is lighted in the tail mode, it is a safety problem.

Figure 10:
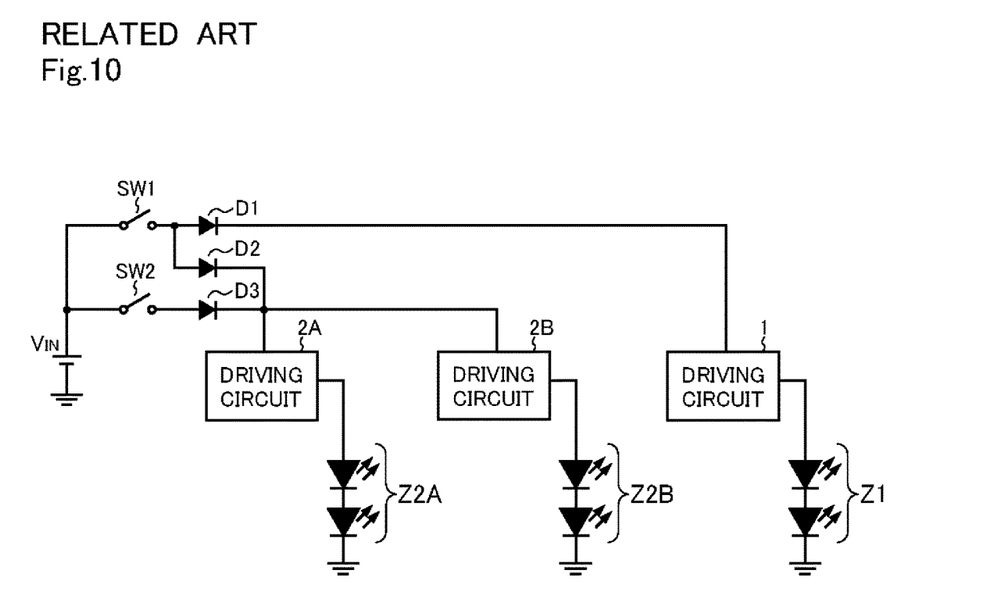
FIG. 10 is a diagram illustrating a structural example of a light emitting device with redundancy of the tail and stop lamp.

Therefore, for example, the driving circuit 2 and the light emitting element Z2 illustrated in FIG. 9A are divided into two redundant circuits of the tail and stop lamps, which include a set of a driving circuit 2A and a light emitting element Z2A, and a set of a driving circuit 2B and a light emitting element Z2B, as illustrated in FIG. 10. Thus, it is possible to avoid that none of lamps positioned on the rear of the vehicle is lighted in the tail mode. However, the structure illustrated in FIG. 10 includes more components than the structure illustrated in FIG. 9A, and hence has a problem that power consumption and cost are increased.

Further, JP-A-2004-34741 proposes a tale/stop lamp having a structure in which each of the tail lamp and the stop lamp is constituted of a plurality of circuits of LEDs so that each of the tail lamp and the stop lamp has redundancy, so as to elongate life of the LEDs by periodic lighting and to light only an unbroken LED when detecting breaking of an LED. Because each of the tail lamp and the stop lamp has redundancy in the tale/stop lamp proposed in JP-A-2004-34741, the structure has a problem that power consumption and cost are increased, similarly to the structure illustrated in FIG. 10, as it requires more components than the structure illustrated in FIG. 9A.

SUMMARY OF THE INVENTION

It is an object of the present invention to provide a light emitting element driving device that can avoid that none of light emitting elements is lighted in a predetermined mode, and to provide a light emitting device and a vehicle using the light emitting element driving device.

A light emitting element driving device disclosed in this specification includes a first driving circuit arranged to be capable of supplying power to a light emitting element connected to an output terminal in a first mode, and to be disabled to supply power to the light emitting element connected to the output terminal in a mode other than the first mode, a second driving circuit arranged to be capable of supplying power to a light emitting element connected to an output terminal in a second mode, a first abnormality detecting portion arranged to detect an abnormality of the light emitting element normally connected to the output terminal of the second driving circuit at least in the second mode, a bypass path connecting the output terminal of the first driving circuit to the output terminal of the second driving circuit, and a first switching portion disposed in the bypass path so as to make the bypass path into a conductive state when an abnormality is detected by the first abnormality detecting portion, and to make the bypass path into a cutoff state when an abnormality is not detected by the first abnormality detecting portion.

A light emitting device disclosed in this specification includes the light emitting element driving device having the structure described above, a first light emitting element normally connected to the output terminal of the first driving circuit, and a second light emitting element normally connected to the output terminal of the second driving circuit.

A vehicle disclosed in this specification includes the light emitting device having the structure described above.

Meanings and effects of the present invention will become more apparent from the description of the embodiment given below. However, the embodiment described below is merely an example of the present invention. Meanings of the present invention and terms of elements should not be limited to those described below in the embodiment.

DETAILED DESCRIPTION OF THE PREFERRED EMBODIMENTS

First Structural Example

Figure 1A:
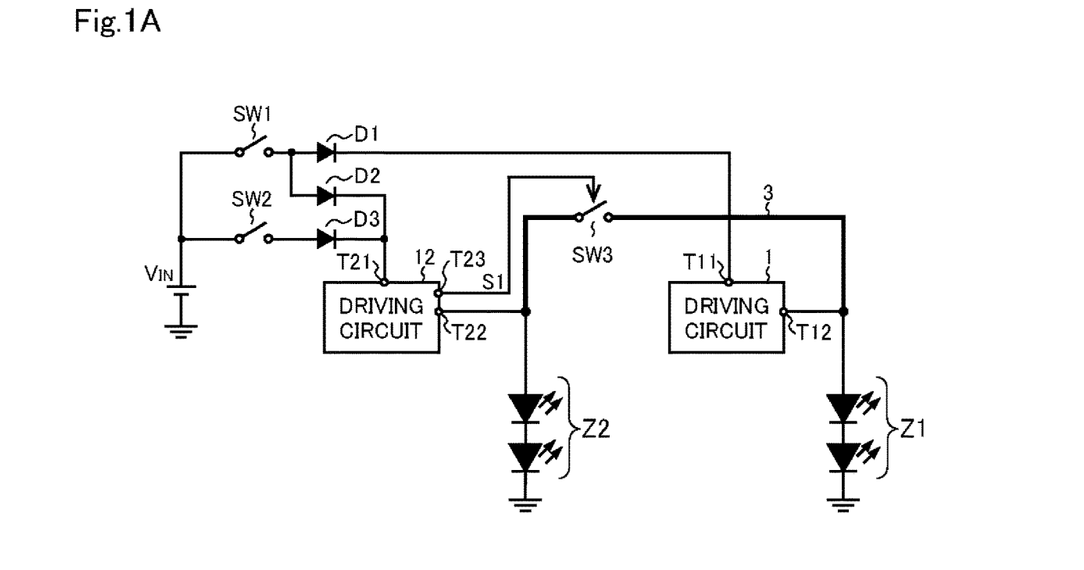
FIG. 1A is a diagram illustrating a first structural example of a light emitting device.

FIG. 1A is a diagram illustrating a first structural example of a light emitting device. Note that, in FIG. 1A, the same part as in FIG. 9A is denoted by the same numeral or symbol. The light emitting device illustrated in FIG. 1A includes switches SW1 and SW2, diodes D1 to D3, driving circuits 1 and 12, at least one light emitting element (light emitting diode in FIG. 1A) Z1, and at least one light emitting element (light emitting diode in FIG. 1A) Z2.

The driving circuit 1 is, for example, a series regulator arranged to supply constant current to the light emitting element connected to an output terminal T12, a switching regulator arranged to supply predetermined on-duty pulse width modulation (PWM) current to the light emitting element connected to the output terminal T12, or the like. Similarly, the driving circuit 12 is, for example, a series regulator arranged to supply constant current to the light emitting element connected to an output terminal T22, a switching regulator arranged to supply predetermined on-duty PWM current to the light emitting element connected to the output terminal T22, or the like.

An input voltage $V_{IN}$ is applied to one end of each of the switches SW1 and SW2. The other end of the switch SW1 is connected to an input terminal T11 of the driving circuit 1 via a reverse current blocking diode D1 and is connected to an input terminal T21 of the driving circuit 12 via a reverse current blocking diode D2. The other end of the switch SW2 is connected to the input terminal T21 of the driving circuit 12 via a reverse current blocking diode D3. The switches SW1 and SW2 and the diodes D1 to D3 function as a control portion arranged to control supply of input power to the driving circuits 1 and 12.

The switch SW1 becomes ON state in a first mode (for example a stop mode). Therefore, in the first mode, the input voltage $V_{IN}$ is supplied to the input terminal T11 of the driving circuit 1 and the input terminal T21 of the driving circuit 12, and hence the driving circuit 1 can supply power to the light emitting element connected to the output terminal T12, while the driving circuit 12 can supply power to the light emitting element connected to the output terminal T22.

The switch SW1 becomes OFF state in a mode other than the first mode. Therefore, in a mode other than the first mode, the input voltage $V_{IN}$ is not supplied to the input terminal T11 of the driving circuit 1, and hence the driving circuit 1 cannot supply power to the light emitting element connected to the output terminal T12.

The switch SW2 becomes ON state in a second mode (for example a tail mode). Therefore, in the second mode, the input voltage $V_{IN}$ is supplied to the input terminal T21 of the driving circuit 12, and hence the driving circuit 12 can supply power to the light emitting element connected to the output terminal T22. Note that it is no problem if there is a state in which the first mode and the second mode are simultaneously active.

The switch SW2 becomes OFF state in a mode other than the second mode. Therefore, in a mode other than the first mode or the second mode, the input voltage $V_{IN}$ is not supplied to the input terminal T21 of the driving circuit 12, and hence the driving circuit 12 cannot supply power to the light emitting element connected to the output terminal T22.

The light emitting element Z1 is normally connected to the output terminal T12 of the driving circuit 1, and the light emitting element Z2 is normally connected to the output terminal T22 of the driving circuit 12.

A bypass path 3 connects the output terminal T12 of the driving circuit 1 to the output terminal T22 of the driving circuit 12. A switch SW3 is disposed in the bypass path 3. Therefore, when the switch SW3 is ON state, the bypass path 3 becomes a conductive state. Thus, the output terminal T12 of the driving circuit 1 is connected to the light emitting element Z2, and the output terminal T22 of the driving circuit 12 is connected to the light emitting element Z1. On the other hand, when the switch SW3 is OFF state, the bypass path 3 becomes a cutoff state. Thus, the output terminal T12 of the driving circuit 1 is not connected to the light emitting element Z2, and the output terminal T22 of the driving circuit 12 is not connected to the light emitting element Z1.

Figure 2:
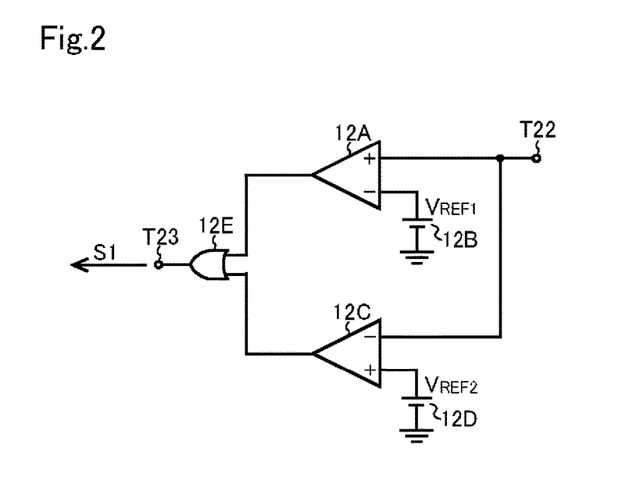
FIG. 2 is a diagram illustrating a structural example of an abnormality detection circuit.

The driving circuit 12 includes an abnormality detection circuit arranged to detect an abnormality of the light emitting element Z2. A structural example of the abnormality detection circuit included in the driving circuit 12 is illustrated in FIG. 2. The abnormality detection circuit of the structural example illustrated in FIG. 2 includes comparators 12A and 12C, reference voltage sources 12B and 12D, and an OR gate 12E. The comparator 12A compares a voltage at the output terminal T22 with a first reference voltage $V_{REF1}$ output from the reference voltage source 12B and outputs a high level signal if the voltage at the output terminal T22 is the first reference voltage $V_{REF1}$ or higher. The comparator 12C compares a voltage at the output terminal T22 with a second reference voltage $V_{REF2}$ (lower than the first reference voltage $V_{REF1}$) output from the reference voltage source 12D, and outputs a high level signal if the voltage at the output terminal T22 is lower than the second reference voltage $V_{REF2}$. When at least one of the output signals of the comparators 12A and 12C is a high level, the OR gate 12E sets a signal S1 to the high level, which is output externally from the driving circuit 12 via a terminal T23.

The first reference voltage $V_{REF1}$ is set to a value higher than total forward voltage of the light emitting element Z2, for example, to be a threshold value for determining whether or not there is an abnormality that the light emitting element Z2 is not lighted due to its breaking. The second reference voltage $V_{REF2}$ is set to a value lower than a forward voltage of one element in the light emitting element Z2, for example, to be a threshold value for determining whether or not there is an abnormality that the light emitting element Z2 is not lighted due to a ground fault. Note that the setting of the first reference voltage $V_{REF1}$ and the second reference voltage $V_{REF2}$ in the above example may be changed so that partial lighting of the light emitting element Z2 can be included in the abnormality of the light emitting element Z2.

In addition, in order to prevent that the signal S1 changes from the high level despite the light emitting element Z2 is abnormal after the switch SW3 becomes ON state, it is preferred to dispose a holding portion arranged to hold the high level of the signal S1 after it becomes the high level unless it is reset.

Here, with reference to FIG. 1A again, the operation of the light emitting device illustrated in FIG. 1A is described. When an abnormality of the light emitting element Z2 is not detected, the signal S1 becomes a low level, and the low level signal S1 makes the switch SW3 to OFF state. Therefore, when an abnormality of the light emitting element Z2 is not detected, the light emitting element Z1 emits light in the first mode, while the light emitting element Z2 emits light both in the second mode and in the first mode.

Figure 1B:
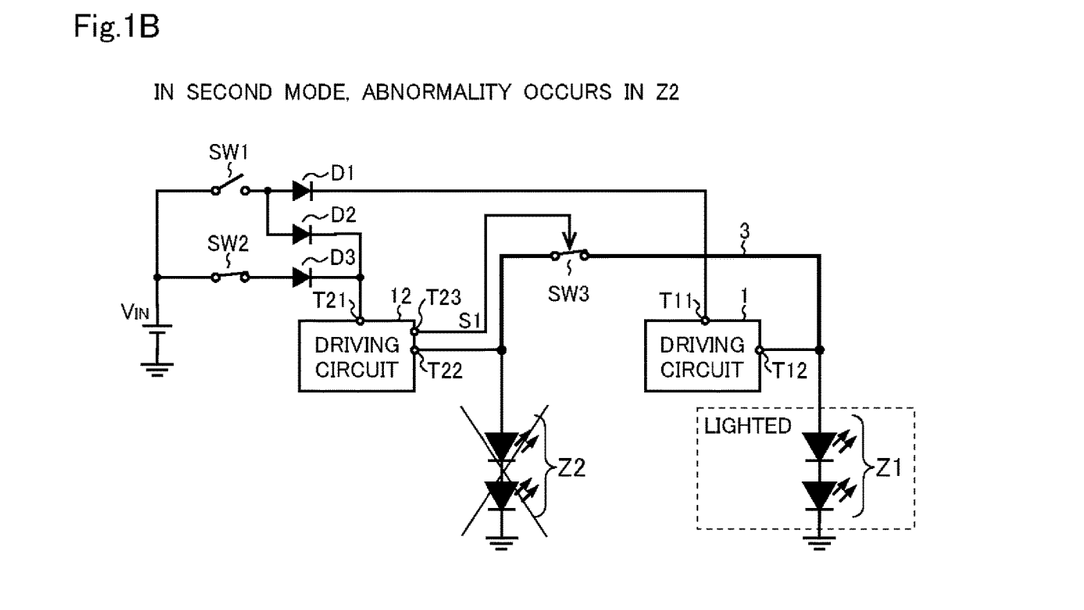
FIG. 1B is a diagram illustrating a lighting state in a tail mode of the light emitting device illustrated in FIG. 1A when an abnormality occurs in a tail and stop lamp.

On the other hand, when an abnormality of the light emitting element Z2 is detected, the signal S1 becomes the high level, and the high level signal S1 makes the switch SW3 to ON state, so that the output terminal T22 of the driving circuit 12 is connected to the light emitting element Z1 via the bypass path 3. Therefore, when an abnormality of the light emitting element Z2 is detected, the light emitting element Z1 emits light both in the first mode and in the second mode as illustrated in FIG. 1B. In other words, even if an abnormality occurs in the light emitting element Z2, it is possible to avoid that none of the light emitting elements is lighted in the second mode.

With the light emitting device illustrated in FIG. 1A, for example, when the light emitting element Z1 is used as a stop lamp disposed at a rear of a vehicle while the light emitting element Z2 is used as a tail and stop lamp disposed at the rear of the vehicle, if an abnormality occurs in the light emitting element Z2, the light emitting element Z1 performs a function as a tail lamp in addition to an original function as a stop lamp. Therefore, it is possible to avoid that none of lamps disposed at the rear of the vehicle in the tail mode, and hence safety is improved.

Second Structural Example

Figure 3:
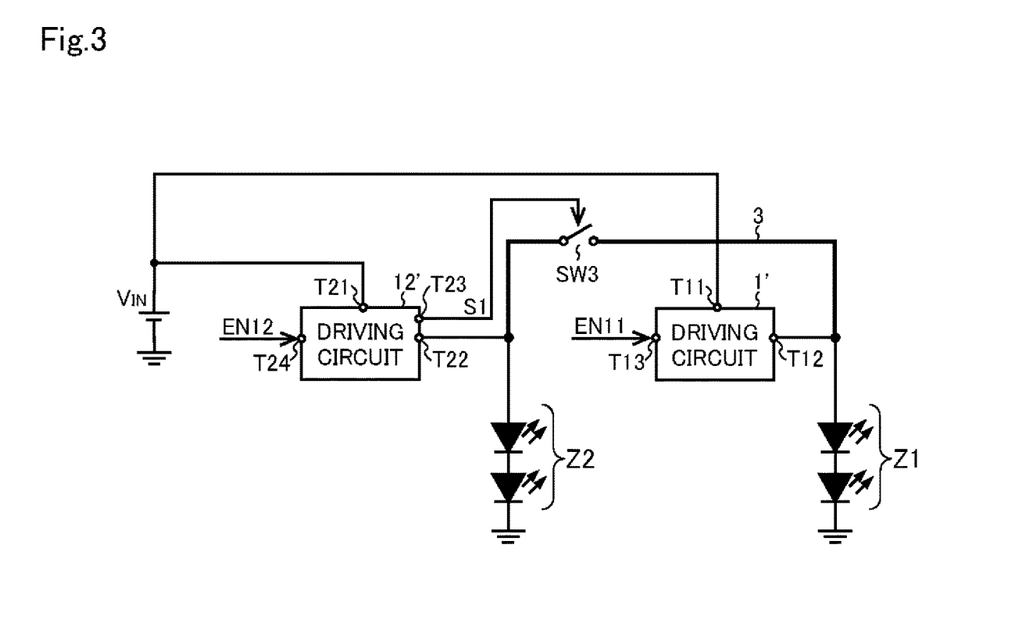
FIG. 3 is a diagram illustrating a second structural example of the light emitting device.

FIG. 3 is a diagram illustrating a second structural example of the light emitting device. The light emitting device illustrated in FIG. 3 has a structure in which the switches SW1 and SW2 and the diodes D1 to D3 are eliminated from the light emitting device illustrated in FIG. 1, and the driving circuits 1 and 12 in FIG. 1 are respectively replaced with driving circuits 1' and 12'. With this structure, the input voltage $V_{IN}$ is directly applied to the input terminal T11 of the driving circuit 1' and the input terminal T21 of the driving circuit 12'.

The driving circuit 1' has a structure in which an enable terminal T13 is added to the driving circuit 1 so as to have an enable function. The driving circuit 1' becomes an enabled state when an enable signal EN11 is supplied to the enable terminal T13, while it becomes a disabled state when the enable signal EN11 is not supplied to the enable terminal T13. For example, a voltage generation circuit disposed in the driving circuit 1' so as to generate an internal power supply voltage becomes an active state when the enable signal EN11 is supplied to the enable terminal T13, while it becomes a non-active state when the enable signal EN11 is not supplied to the enable terminal T13.

The driving circuit 12' has a structure in which an enable terminal T24 is added to the driving circuit 12 so as to have an enable function. The driving circuit 12' becomes an enabled state when an enable signal EN12 is supplied to the enable terminal T24, while it becomes a disabled state when the enable signal EN12 is not supplied to the enable terminal T24. For example, a voltage generation circuit disposed in the driving circuit 12' so as to generate an internal power supply voltage becomes an active state when the enable signal EN12 is supplied to the enable terminal T24, while it becomes a non-active state when the enable signal EN12 is not supplied to the enable terminal T24.

In the first mode (for example the stop mode), when the enable signal EN11 is supplied to the enable terminal T13 of the driving circuit 1', the driving circuit 1' can supply power to the light emitting element connected to the output terminal T12. Further, when the enable signal EN12 is supplied to the enable terminal T24 of the driving circuit 12', the driving circuit 12' can supply power to the light emitting element connected to the output terminal T22.

In a mode other than the first mode, the enable signal EN11 is not supplied to the enable terminal T13 of the driving circuit 1', and hence the driving circuit 1' cannot supply power to the light emitting element connected to the output terminal T12.

In the second mode (for example the tail mode), when the enable signal EN12 is supplied to the enable terminal T24 of the driving circuit 12', the driving circuit 12' can supply power to the light emitting element connected to the output terminal T22.

In a mode other than the second mode (for example the tail mode), the enable signal EN12 is not supplied to the enable terminal T24 of the driving circuit 12'. Therefore, in a mode other than the first mode or the second mode, because the enable signal EN12 is not supplied to the enable terminal T24 of the driving circuit 12', the driving circuit 12' cannot supply power to the light emitting element connected to the output terminal T22.

Similarly to the light emitting device illustrated in FIG. 1, in the light emitting device illustrated in FIG. 3, even if an abnormality occurs in the light emitting element Z2, it is possible to avoid that none of the light emitting elements is lighted in the second mode. Further, because the light emitting device illustrated in FIG. 3 can eliminate the discrete components (the switches SW1 and SW2 and the diodes D1 to D3), it is possible to achieve a lower cost and a smaller size than the light emitting device illustrated in FIG. 1.

Third Structural Example

Figure 4:
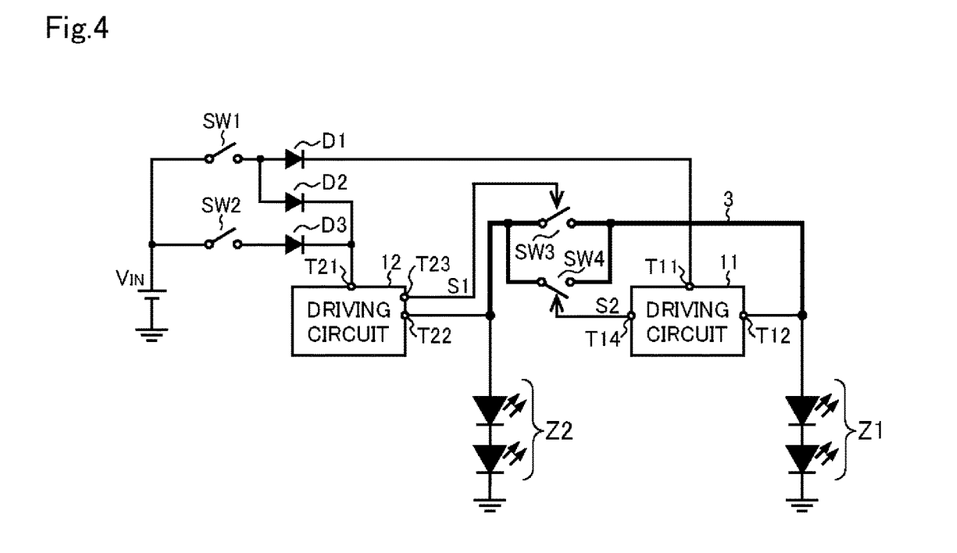
FIG. 4 is a diagram illustrating a third structural example of the light emitting device.

FIG. 4 is a diagram illustrating a third structural example of the light emitting device. The light emitting device illustrated in FIG. 4 has a structure in which a switch SW4 is added to the light emitting device illustrated in FIG. 1, and the driving circuit 1 is replaced with a driving circuit 11. The switch SW4 is disposed in the bypass path 3 and is connected in parallel to the switch SW3.

The driving circuit 11 has a structure in which the abnormality detection circuit arranged to detect an abnormality of the light emitting element Z1 is added to the driving circuit 1. In other words, the driving circuit 11 includes the abnormality detection circuit arranged to detect an abnormality of the light emitting element Z1. A structural example of the abnormality detection circuit disposed in the driving circuit 11 has a structure in which the terminal T22 in the structure illustrated in FIG. 2 is replaced with the terminal T12, and the terminal T23 is replaced with a terminal T14, from which a signal S2 is output.

The first reference voltage $V_{REF1}$ is set to a value higher than total forward voltage of the light emitting element Z1, for example, to be a threshold value for determining whether or not there is an abnormality that the light emitting element Z1 is not lighted due to its breaking. The second reference voltage $V_{REF2}$ is set to a value lower than a forward voltage of one element in the light emitting element Z1, for example, to be a threshold value for determining whether or not there is an abnormality that the light emitting element Z1 is not lighted due to a ground fault. Note that the setting of the first reference voltage $V_{REF1}$ and the second reference voltage $V_{REF2}$ in the above example may be changed so that partial lighting of the light emitting element Z1 can be included in the abnormality of the light emitting element Z1.

In addition, in order to prevent that the signal S2 changes from the high level despite the light emitting element Z1 is abnormal after the switch SW4 becomes ON state, it is preferred to dispose a holding portion arranged to hold the high level of the signal S2 after it becomes the high level unless it is reset.

Here, with reference to FIG. 4 again, the operation of the light emitting device illustrated in FIG. 4 is described. When an abnormality of the light emitting element Z1 is not detected, the signal S2 becomes the low level, and the low level signal S2 makes the switch SW4 to OFF state. Therefore, when an abnormality of the light emitting elements Z1 and Z2 is not detected, the light emitting element Z1 emits light in the first mode, while the light emitting element Z2 emits light both in the second mode and in the first mode.

In addition, when an abnormality of the light emitting element Z2 is detected, the signal S1 becomes the high level, and the high level signal S1 makes the switch SW3 to ON state, so that the output terminal T22 of the driving circuit 12 is connected to the light emitting element Z1 via the bypass path 3. Therefore, when an abnormality of the light emitting element Z2 is detected, the light emitting element Z1 emits light both in the first mode and in the second mode. In other words, even if an abnormality occurs in the light emitting element Z2, it is possible to avoid that none of the light emitting elements is lighted in the second mode.

In addition, when an abnormality of the light emitting element Z1 is detected, the signal S2 becomes the high level, and the high level signal S2 makes the switch SW4 to ON state, so that the output terminal T12 of the driving circuit 11 is connected to the light emitting element Z2 via the bypass path 3. Therefore, when an abnormality of the light emitting element Z1 is detected, the light emitting element Z2 emits light in the second mode. In the first mode, current is supplied from both the driving circuits 11 and 12, and therefore the light emitting element Z2 emits light with higher luminance than the second mode. Thus, the first mode and the second mode can be easily discriminated from each other based on the light emission state of the light emitting element Z2.

Note that it can be regarded that an abnormality of the light emitting element Z1 and an abnormality of the light emitting element Z2 do not occur at the same time, and hence the case where an abnormality of the light emitting element Z1 and an abnormality of the light emitting element Z2 occur at the same time is not considered here.

Fourth Structural Example

Figure 5:
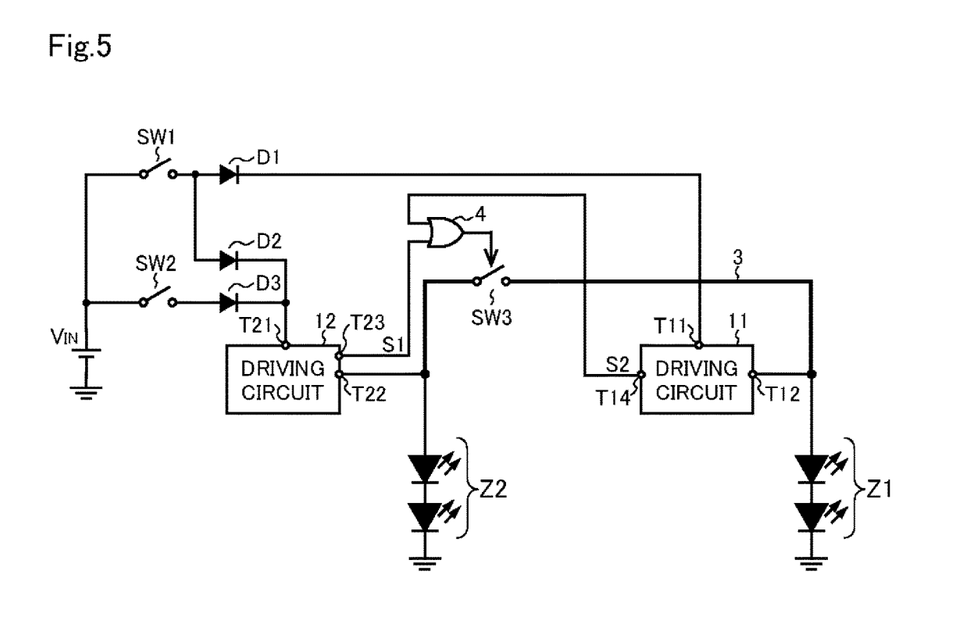
FIG. 5 is a diagram illustrating a fourth structural example of the light emitting device.

FIG. 5 is a diagram illustrating a fourth structural example of the light emitting device. The light emitting device illustrated in FIG. 5 has a structure in which the switches SW3 and SW4 of the light emitting device illustrated in FIG. 4 are integrated so that only the switch SW3 is left, and an OR gate 4 that outputs a logical OR of the signal S1 and the signal S2 is added. ON state and OFF state of the switch SW3 are switched by the output signal of the OR gate 4.

The light emitting device illustrated in FIG. 5 produces the same effect as the light emitting device illustrated in FIG. 4.

Application

Figure 6:
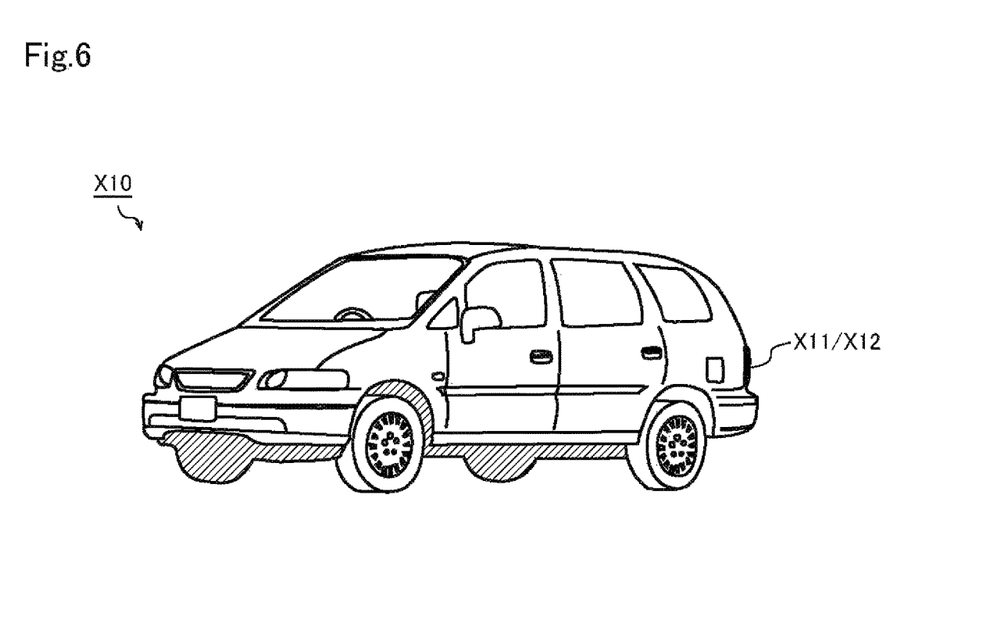
FIG. 6 is an external view (front) of a vehicle in which the light emitting device is mounted.
Figure 7:
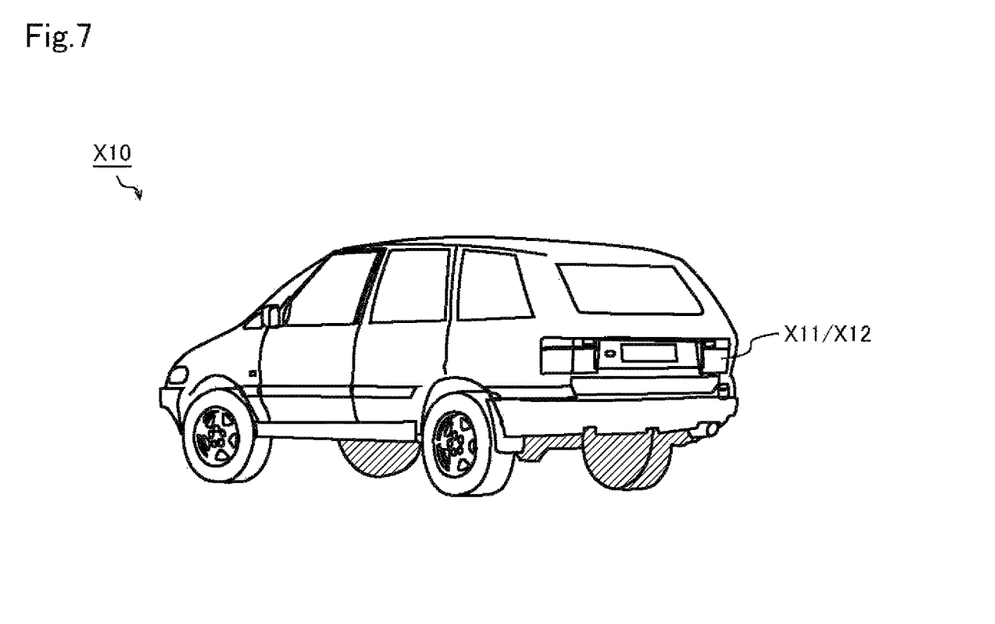
FIG. 7 is an external view (rear) of the vehicle in which the light emitting device is mounted.

The light emitting device described above can be appropriately used as a tail lamp (appropriately including a side lamp and a back lamp) X11 and a stop lamp X12, for example, as illustrated in FIGS. 6 and 7.

Figure 8:
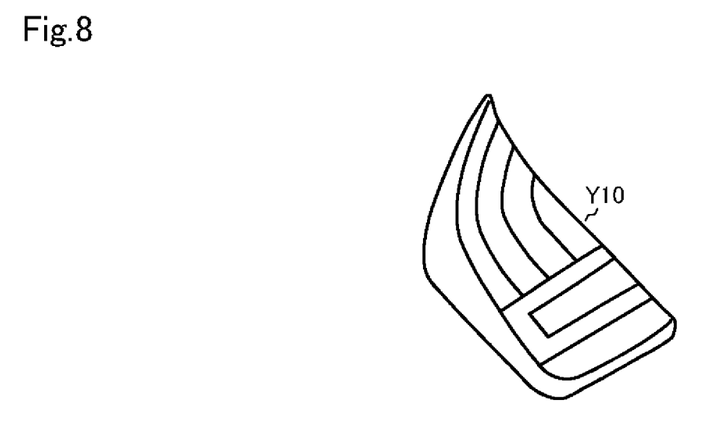
FIG. 8 is an external view of an LED rear lamp module.

Note that the light emitting device described above may be provided as an LED rear lamp module Y10 illustrated in FIG. 8. In addition, it may be provided in a form of the light emitting element driving device in which the light emitting elements Z1 and Z2 are eliminated from the light emitting device described above.

Other Variations

Note that, in the embodiment described above, the structure in which the light emitting diode is used as the light emitting element is exemplified, but the present invention is not limited to this structure. For example, it is also possible to use an organic electro-luminescence (EL) element as the light emitting element.

In addition, other than the embodiment described above, the various technical features disclosed in this specification can be variously modified within the scope of the technical invention without deviating from the spirit thereof. For example, the diode D2 may be eliminated in the first, third, and fourth structural examples. In this case, the light emitting element Z2 is used not as the tail and stop lamp but as the tail lamp, for example. However, in the third and fourth structural examples, when an abnormality occurs in the light emitting element Z1, the light emitting element Z1 performs the function as the stop lamp in addition to the original function as the tail lamp. In addition, the abnormality detection circuit disposed in the driving circuit 12 may perform the detection operation only in the second mode. In addition, the abnormality detection circuit disposed in the driving circuit 11 may perform the detection operation only in the first mode.

In other words, the embodiment described above is merely an example in every aspect and should not be interpreted as a limitation. The scope of the present invention is defined not by the above description of the embodiment but by the claims, which should be understood to include all modifications within meanings and scopes equivalent to the claims.

Summary

The light emitting element driving device described above includes a first driving circuit arranged to be capable of supplying power to a light emitting element connected to an output terminal in a first mode, and to be disabled to supply power to the light emitting element connected to the output terminal in a mode other than the first mode, a second driving circuit arranged to be capable of supplying power to a light emitting element connected to an output terminal in a second mode, a first abnormality detecting portion arranged to detect an abnormality of the light emitting element normally connected to the output terminal of the second driving circuit at least in the second mode, a bypass path connecting the output terminal of the first driving circuit to the output terminal of the second driving circuit, and a first switching portion disposed in the bypass path so as to make the bypass path into a conductive state when an abnormality is detected by the first abnormality detecting portion, and to make the bypass path into a cutoff state when an abnormality is not detected by the first abnormality detecting portion (first structure).

In addition, the light emitting element driving device of the first structure described above may have a structure, in which the second driving circuit is capable of supplying power to the light emitting element connected to the output terminal in the first mode and is disabled to supply power to the light emitting element connected to the output terminal in a mode other than the first mode or the second mode (second structure).

In addition, the light emitting element driving device of the first or second structure described above may further include a control portion arranged to control supply of input power to the first driving circuit and the second driving circuit, in which the control portion supplies the input power to the first driving circuit in the first mode and does not supply the input power to the first driving circuit in a mode other than the first mode, while the control portion supplies the input power to the second driving circuit in the second mode (third structure).

In addition, the light emitting element driving device of the third structure described above may have a structure, in which the control portion supplies the input power to the second driving circuit in the first mode and does not supply the input power to the second driving circuit in a mode other than the first mode or the second mode (fourth structure).

In addition, the light emitting element driving device of the first or second structure described above may have a structure, in which the first driving circuit becomes an enabled state in the first mode and becomes a disabled state in a mode other than the first mode, and the second driving circuit becomes an enabled state in the second mode (fifth structure).

In addition, the light emitting element driving device of the fifth structure described above may have a structure, in which the second driving circuit becomes an enabled state in the first mode and becomes a disabled state in a mode other than the first mode or the second mode (sixth structure).

In addition, the light emitting element driving device of the fifth or sixth structure described above may further include a second abnormality detecting portion arranged to detect an abnormality of the light emitting element normally connected to the output terminal of the first driving circuit at least in the first mode, and a second switching portion disposed in the bypass path so as to make the bypass path into a conductive state when an abnormality is detected by the second abnormality detecting portion, and to make the bypass path into a cutoff state when an abnormality is not detected by the second abnormality detecting portion (seventh structure).

The light emitting device described above includes the light emitting element driving device according to any one of the first to seventh structures, a first light emitting element normally connected to the output terminal of the first driving circuit, and a second light emitting element normally connected to the output terminal of the second driving circuit (eighth structure).

In addition, the light emitting device of the eighth structure described above may have a structure in which each of the first light emitting element and the second light emitting element is a light emitting diode or an organic EL element (ninth structure).

In addition, the light emitting device of the eighth or ninth structure described above may have a structure in which the first light emitting element is used as a stop lamp, and the second light emitting element is used as a tail lamp or a tail and stop lamp (tenth structure).

In addition, the light emitting device of the tenth structure described above may have a structure in which the light emitting device is mounted as a rear lamp module in a vehicle (eleventh structure).

The vehicle described above includes the light emitting device according to the eighth or ninth structure (twelfth structure).

What is claimed is:

1. A light emitting element driving device comprising:
    a first driving circuit arranged to be capable of supplying power to a first light emitting element connected to an output terminal in a first mode, and to be disabled to supply power to the first light emitting element connected to the output terminal in a mode other than the first mode;
    a second driving circuit arranged to be capable of supplying power to a second light emitting element connected to an output terminal in a second mode;
    a first abnormality detecting portion arranged to detect an abnormality of the first light emitting element normally connected to the output terminal of the first driving circuit at least in the first mode;
    a second abnormality detecting portion arranged to detect an abnormality of the second light emitting element normally connected to the output terminal of the second driving circuit at least in the second mode;
    a bypass path connecting the output terminal of the first driving circuit to the output terminal of the second driving circuit; and
    a first switching portion disposed in the bypass path so as to make the bypass path into a conductive state, in which the output terminals of the first and second driving circuits are connected together, when an abnormality is detected by either the first or second abnormality detecting portion, and to make the bypass path into a cutoff state, in which the output terminals of the first and second driving circuits are disconnected from each other, when an abnormality is not detected by either the first or second abnormality detecting portion.

2. The light emitting element driving device according to claim 1, wherein the second driving circuit is capable of supplying power to the second light emitting element connected to the output terminal in the first mode and is disabled to supply power to the second light emitting element connected to the output terminal in a mode other than the first mode or the second mode.

3. The light emitting element driving device according to claim 1, further comprising a control portion arranged to control supply of input power to the first driving circuit and the second driving circuit, wherein the control portion supplies the input power to the first driving circuit in the first mode and does not supply the input power to the first driving circuit in a mode other than the first mode, while the control portion supplies the input power to the second driving circuit in the second mode.

4. The light emitting element driving device according to claim 2, further comprising a control portion arranged to control supply of input power to the first driving circuit and the second driving circuit, wherein
the control portion supplies the input power to the first driving circuit in the first mode and does not supply the input power to the first driving circuit in a mode other than the first mode, while the control portion supplies the input power to the second driving circuit in the second mode.

5. The light emitting element driving device according to claim 3, wherein the control portion supplies the input power to the second driving circuit in the first mode and does not supply the input power to the second driving circuit in a mode other than the first mode or the second mode.

6. The light emitting element driving device according to claim 4, wherein the control portion supplies the input power to the second driving circuit in the first mode and does not supply the input power to the second driving circuit in a mode other than the first mode or the second mode.

7. The light emitting element driving device according to claim 1, wherein
the first driving circuit becomes an enabled state in the first mode and becomes a disabled state in a mode other than the first mode, and
the second driving circuit becomes an enabled state in the second mode.

8. The light emitting element driving device according to claim 2, wherein
the first driving circuit becomes an enabled state in the first mode and becomes a disabled state in a mode other than the first mode, and
the second driving circuit becomes an enabled state in the second mode.

9. The light emitting element driving device according to claim 7, wherein the second driving circuit becomes an enabled state in the first mode and becomes a disabled state in a mode other than the first mode or the second mode.

10. The light emitting element driving device according to claim 8, wherein the second driving circuit becomes an enabled state in the first mode and becomes a disabled state in a mode other than the first mode or the second mode.

11. The light emitting element driving device according to claim 1 wherein:
the first switching portion includes a first sub switching portion and a second sub switching portion that are connected in parallel with each other,
the first sub switching portion makes the bypass path into a conductive state when an abnormality is detected by the first abnormality detecting portion, and makes the bypass path into a cutoff state when an abnormality is not detected by the first abnormality detecting portion, and
the second sub switching portion makes the bypass path into a conductive state when an abnormality is detected by the second abnormality detecting portion, and makes the bypass path into a cutoff state when an abnormality is not detected by the second abnormality detecting portion.

12. A light emitting device comprising: the light emitting element driving device according to claim 1;
the first light emitting element normally connected to the output terminal of the first driving circuit; and
the second light emitting element normally connected to the output terminal of the second driving circuit.

13. The light emitting device according to claim 12, wherein each of the first light emitting element and the second light emitting element is a light emitting diode or an organic EL element.

14. The light emitting device according to claim 12, wherein
the first light emitting element is used as a stop lamp, and
the second light emitting element is used as a tail lamp or a tail and stop lamp.

15. The light emitting device according to claim 13, wherein
the first light emitting element is used as a stop lamp, and
the second light emitting element is used as a tail lamp or a tail and stop lamp.

16. The light emitting device according to claim 14, wherein the light emitting device is mounted as a rear lamp module in a vehicle.

17. The light emitting device according to claim 15, wherein the light emitting device is mounted as a rear lamp module in a vehicle.

18. A vehicle comprising the light emitting device according to claim 14.

19. A vehicle comprising the light emitting device according to claim 15.

20. The light emitting device according to claim 1, wherein
when an abnormality is detected by the second abnormality detecting portion in the first mode, current is supplied to the first light emitting element normally connected to the output terminal of the first driving circuit,
when an abnormality is detected by the first abnormality detecting portion in the first mode, current is supplied to the second light emitting element normally connected to the output terminal of the second driving circuit,
when an abnormality is not detected by either the first or the second abnormality detecting portion in the first mode, current is supplied to both the first light emitting element normally connected to the output terminal of the first driving circuit and the second light emitting element normally connected to the output terminal of the second driving circuit,
when an abnormality is detected by the second abnormality detecting portion in the second mode, current is supplied to the first light emitting element normally connected to the output terminal of the first driving circuit,
when an abnormality is detected by the second first abnormality detecting portion in the second mode, current is supplied to the second light emitting element normally connected to the output terminal of the second driving circuit, and
when an abnormality is not detected by either the first or the second abnormality detecting portion in the second mode, current is supplied to the second light emitting element normally connected to the output terminal of the second driving circuit but no current is supplied to the first light emitting element normally connected to the output terminal of the first driving circuit.

21. A light emitting element driving device comprising: a first driving circuit arranged to be capable of supplying power to a first light emitting element connected to an output terminal in a first mode, and to be disabled to supply power to the first light emitting element connected to the output terminal in a mode other than the first mode;

a second driving circuit arranged to be capable of supplying power to a second light emitting element connected to an output terminal in a second mode;

a second-driving-circuit abnormality detecting portion arranged to detect an abnormality of the second light emitting element normally connected to the output terminal of the second driving circuit at least in the second mode;

a bypass path connecting the output terminal of the first driving circuit to the output terminal of the second driving circuit; and a first switching portion disposed in the bypass path so as to make the bypass path into a conductive state to connect together an anode of the first light emitting element normally connected to the output terminal of the first driving circuit and an anode of the second light emitting element normally connected to the output terminal of the second driving circuit when an abnormality is detected by the second-driving-circuit abnormality detecting portion, and to make the bypass path into a cutoff state to disconnect from each other the anode of the first light emitting element normally connected to the output terminal of the first driving circuit and the anode of the second light emitting element normally connected to the output terminal of the second driving circuit when an abnormality is not detected by the second-driving-circuit abnormality detecting portion.

22. The light emitting device according to claim 21, wherein the anode of the first light emitting element normally connected to the output terminal of the first driving circuit is connected to one end of the bypass path, and the anode of the second light emitting element normally connected to the output terminal of the second driving circuit is connected to another end of the bypass path.

23. The light emitting device according to claim 21, further comprising: a first-driving-circuit abnormality detecting portion arranged to detect an abnormality of the first light emitting element normally connected to the output terminal of the first driving circuit at least in the first mode; and an OR circuit arranged to output a logical OR of outputs of the first-driving-circuit and second-driving-circuit abnormality detecting portions, wherein the first switching portion is controlled by an output of the OR circuit.

24. The light emitting device according to claim 21, wherein when the bypass path is in the conductive state, the first light emitting element normally connected to the output terminal of the first driving circuit and the second light emitting element normally connected to the output terminal of the second driving circuit are connected in parallel with each other.

25. The light emitting device according to claim 21, further comprising:

a control portion arranged to control input power to the first and second driving circuits, and the control portion includes:

a first mode switch which is in an ON state in the first mode;

a second mode switch which is in an ON state in the second mode;

a first diode of which an anode is connected to the first mode switch and of which a cathode is connected to the first driving circuit;

a second diode of which an anode is connected to the first mode switch and of which a cathode is connected to the second driving circuit; and a third diode of which an anode is connected to the second mode switch and of which a cathode is connected to the second driving circuit.

* * * * *